(12) United States Patent
Fukumoto et al.

(10) Patent No.: US 11,383,671 B2
(45) Date of Patent: Jul. 12, 2022

(54) GAS GENERATOR (71) Applicant: Daicel Corporation, Osaka (JP)

(72) Inventors: Kenji Fukumoto, Tatsuno (JP); Teppei Hanano, Tatsuno (JP)

(73) Assignee: DAICEL CORPORATION, Osaka (JP)

( * ) Notice: Subject to any disclaimer, the term of this patent is extended or adjusted under 35 U.S.C. 154(b) by 206 days.

(21) Appl. No.: 16/627,937

(22) PCT Filed: Jul. 6, 2018

(86) PCT No.: PCT/JP2018/025651
§ 371 (c)(1),
(2) Date: Dec. 31, 2019

(87) PCT Pub. No.: WO2019/035285
PCT Pub. Date: Feb. 21, 2019

(65) Prior Publication Data
US 2020/0164327 A1 May 28, 2020

(30) Foreign Application Priority Data

Aug. 14, 2017 (JP) .............................. JP2017-156569

(51) Int. Cl.
*B60R 21/264* (2006.01)
*B01J 7/00* (2006.01)
(52) U.S. Cl.
CPC ........ *B60R 21/2644* (2013.01); *B60R 21/264* (2013.01); *B01J 7/00* (2013.01)
(58) Field of Classification Search
CPC .......... B01J 7/00; B60R 21/26; B60R 21/264; B60R 21/2644; B60R 2021/2648; B60R 2021/26066

(Continued)

(56) References Cited

U.S. PATENT DOCUMENTS 6,196,583 B1  3/2001  Ruckdeschel et al.
7,527,289 B2  5/2009  Numoto et al.
(Continued)

FOREIGN PATENT DOCUMENTS

JP  2009-126292 A  6/2009
JP  2011-162149 A  8/2011
JP      5399935 B2  1/2014

OTHER PUBLICATIONS

International Preliminary Report on Patentability arid English translation of the Written Opinion of the International Searching Authority for International Application No. PCT/JP2018/025651, dated Feb. 27, 2020.

(Continued)

*Primary Examiner* — James S Bergin
(74) *Attorney, Agent, or Firm* — Birch, Stewart, Kolasch & Birch, LLP (57) ABSTRACT

A gas generator including an enhancer chamber provided on a first end of a cylindrical housing and including an igniter therein, a diffuser portion formed with a gas discharge port on a second end, a combustion chamber provided between the diffuser portion and the enhancer chamber, the enhancer chamber being an internal space which is axially sandwiched between the igniter and a cup-shaped partition wall, the internal space accommodating therein an enhancing agent, the cup-shaped partition wall including a peripheral wall provided with a peripheral wall body with a plurality of nozzles and an annular portion expanding outwardly from the peripheral wall body, an outer surface of the annular portion abutting against an inner wall surface of the cylindrical housing, a cylindrical gap being formed between the peripheral wall body and the inner wall surface, the nozzles being disposed to face the cylindrical gap, and the cylindrical gap being devoid of the gas generating agent therein.

11 Claims, 7 Drawing Sheets (58) Field of Classification Search
USPC .................. 102/530, 531; 280/736, 741, 742
See application file for complete search history.

(56) References Cited

U.S. PATENT DOCUMENTS

| | | | | |
|---|---|---|---|---|
| 7,950,691 | B1 * | 5/2011 | Mayville | ............... B60R 21/261 |
| | | | | 280/736 |
| 8,302,992 | B2 * | 11/2012 | Hanano | ............... B60R 21/2644 |
| | | | | 280/740 |
| 9,114,778 | B2 * | 8/2015 | Hanano | ............... B60R 21/2644 |
| 2007/0024038 | A1 * | 2/2007 | Numoto | ............. B60R 21/2644 |
| | | | | 280/736 |
| 2011/0187088 | A1 | 8/2011 | Hanano et al. | |

OTHER PUBLICATIONS

International Search Report for International Application No. PCT/JP2018/025651, dated Oct. 9, 2018.

\* cited by examiner

GAS GENERATOR

TECHNICAL FIELD

The present invention relates to a gas generator that can be used for an airbag device in an automobile.

BACKGROUND ART

A gas generator used in a device for deploying an airbag on a side of a vehicle occupant often has an elongated tubular shape in consideration of a position for attaching the gas generator, and the gas generator is disposed within a vehicle, with an axis of a tubular housing of the gas generator being oriented in a substantially vertical direction or in a horizontal direction.

A known gas generator including a tubular housing is structured to include an igniter disposed on one end side thereof, a diffuser portion disposed on an opposite side thereto in an axial direction, and a gas generating agent accommodated between the igniter and the diffuser portion. In such a gas generator, combustion of a gas generating agent occurs from a gas generating agent at a position close to the igniter to a gas generating agent at a side of the diffuser portion in this order, and thus, the ease of combustion of the gas generating agent is important.

An example related to the present invention includes the gas generator in JP 5399935 B.

Furthermore, in the gas generator illustrated in FIG. 1 of U.S. Pat. No. 7,527,289 B, with the gas discharge port 84 being disposed in the intermediate position, the combustion chamber is separated into the first combustion chamber 40 accommodating the first gas generating agent 43 therein and the second combustion chamber 70 accommodating the second gas generating agent 73 therein.

SUMMARY OF INVENTION

A first aspect of the present invention (hereinafter referred to as a "first aspect") provides a gas generator including an enhancer chamber provided on a side of a first end portion of a cylindrical housing and including an igniter therein, a diffuser portion formed with a gas discharge port on a side of a second end portion, which is an axially opposite side to the first end portion, and a combustion chamber provided between the diffuser portion and the enhancer chamber, the combustion chamber accommodating a gas generating agent therein. In the gas generator, the enhancer chamber including the igniter is an internal space which is axially sandwiched between the igniter fixed on the side of the first end portion of the cylindrical housing and a cup-shaped partition wall disposed within the cylindrical housing, the internal space accommodating an enhancing agent therein. In the gas generator, the cup-shaped partition wall includes a bottom, a peripheral wall, and an opening, the peripheral wall includes a peripheral wall body and an annular portion expanding outwardly from the peripheral wall body, and the peripheral wall body includes, in a thickness direction thereof, a plurality of nozzles penetrating the peripheral wall body. In the gas generator, an outer surface of the annular portion of the cup-shaped partition wall abuts against an inner wall surface of the cylindrical housing, a cylindrical gap is formed between the peripheral wall body and the inner wall surface of the cylindrical housing radially facing the peripheral wall body, the nozzles formed in the peripheral wall body are disposed to face the cylindrical gap, and the cylindrical gap is devoid of the gas generating agent therein.

A second aspect of the present invention (hereinafter referred to as a "second aspect") provides a gas generator including an enhancer chamber provided on a side of a first end portion of a cylindrical housing and including an igniter therein, a diffuser portion formed with a gas discharge port on a side of a second end portion, which is an axially opposite side to the first end portion, and a combustion chamber provided between the diffuser portion and the enhancer chamber, the combustion chamber accommodating a gas generating agent therein. In the gas generator, the enhancer chamber including the igniter is an internal space which is axially sandwiched between the igniter fixed on the side of the first end portion of the cylindrical housing and a cup-shaped partition wall disposed within the cylindrical housing, the internal space accommodating an enhancing agent therein. In the gas generator, the cup-shaped partition wall includes a bottom, a peripheral wall, and an opening, the peripheral wall is provided with a groove-formed portion including a plurality of grooves at a portion of the peripheral wall on a side of the bottom and a non groove-formed portion devoid of the grooves at a remaining portion of the peripheral wall on a side of the opening. In the gas generator, the plurality of grooves in the groove-formed portion are extended from a boundary contiguous with the bottom to the non groove-formed portion and are formed in a circumferential direction, and nozzles are formed in the grooves of the groove-formed portion to penetrate in a thickness direction. In the gas generator, an outer surface of the peripheral wall of the cup-shaped partition wall abuts against an inner wall surface of the cylindrical housing, and a plurality of axially extending gaps are formed between the plurality of grooves of the groove-formed portion and the inner wall surface of the cylindrical housing radially facing the plurality of grooves of the groove-formed portion. In the gas generator, the gaps are devoid of the gas generating agent.

BRIEF DESCRIPTION OF DRAWINGS

The present invention will be more fully understood from the detailed description given hereinbelow and the accompanying drawings, which are given for explanation only and do not limit the present invention.

DESCRIPTION OF EMBODIMENTS

In the gas generator of JP 5399935 B, the cylindrical member 30 is disposed within the cylindrical housing 10, and thus, the combustibility of the gas generating agent 50 is improved.

In the gas generator illustrated in FIG. 1 of U.S. Pat. No. 7,527,289 B, the combustion chamber is separated into two combustion chambers to shorten the axial length of each of the chambers, and thus, the combustibility of the gas generating agent is improved.

The present invention provides a gas generator having favorable combustibility of a gas generating agent and favorable dischargeability of combustion gas containing a combustion product from an enhancing agent.

A gas generator according to the first aspect is the gas generator of JP 5399935 B, which is modified to achieve the weight reduction and simplification of assembly by not using the cylindrical member 30, as well as the improvement in combustibility of a gas generating agent and dischargeability of gas containing a combustion product from an enhancing agent.

A cup-shaped partition wall includes a peripheral wall body and an annular portion expanding outwardly from the peripheral wall body.

The peripheral wall body includes a nozzle for making an enhancer chamber and a cylindrical gap communicate with each other. The nozzle is formed to penetrate the peripheral wall body in a thickness direction thereof, and a size of the nozzle may be adjusted to form one or a plurality of nozzles in the peripheral wall body. Note that some of the nozzles may be formed in a bottom as long as the effect of the present invention can be achieved.

The cup-shaped partition wall may employ an aspect A in which the cup-shaped partition wall includes an annular portion (large-diameter peripheral wall) having an outer diameter larger than that of the peripheral wall body (small-diameter peripheral wall), and further includes an annular stepped portion created by a difference between the outer diameter of the small-diameter peripheral wall and the outer diameter of the large-diameter peripheral wall, or an aspect B in which the cup-shaped partition wall includes the peripheral wall body and a flange part (annular portion) formed at an opening of the peripheral wall body, and the flange part is extended outwardly in a radial direction or the flange part is extended outwardly in a diagonal direction.

The outer diameter of the annular portion is substantially the same as the inner diameter of the cylindrical housing, and when the cup-shaped partition wall is inserted into the cylindrical housing, the annular portion abuts against the inner wall surface of the cylindrical housing.

The outer diameter of the peripheral wall body is smaller than the inner diameter of the cylindrical housing, and thus, when the cup-shaped partition wall is inserted into the cylindrical housing, a cylindrical gap is formed between the peripheral wall body and the inner wall surface of the cylindrical housing. The width of the cylindrical gap may be uniform or may be partially narrowed or widened.

Note that to prevent the cup-shaped partition wall from moving toward the side of the second end portion when the cup-shaped partition wall is inserted into the cylindrical housing, either a method of pressing the annular portion (the large-diameter peripheral wall in the aspect A, and the flange part in the aspect B) into the cylindrical housing, or a method of forming a plurality of inner projections on the inner wall surface of the cylindrical housing to cause the inner projections to abut against the annular portion of the cup-shaped partition wall may be employed.

Next, a specific effect caused by the cylindrical gap between the peripheral wall body of the cup-shaped partition wall and the inner wall surface of the cylindrical housing in the gas generator of the first aspect will be described.

Note that considering the manifestation of the specific effect caused by the cylindrical gap, a method of assembling the gas generator of the first aspect will be described. The gas generator of the first aspect is assembled as follows, for example.

First, a diffuser portion is attached to the opening at the side of the second end portion of the cylindrical housing.

Next, a desired amount of gas generating agent is accommodated in a space serving as a combustion chamber of the cylindrical housing. In accommodation of the gas generating agent, a plurality of gas generating agent molded bodies are randomly filled into the combustion chamber. The size and shape of the gas generating agent are not particularly limited and known gas generating agents can be used, and examples thereof include a gas generating agent having a columnar shape, a columnar shape with a recess or a through hole, a disk shape, and a disk shape with a recess or a through hole. When the gas generating agent is accommodated in a space serving as the combustion chamber, the gas generating agent is randomly filled while vibration is applied in a manner such as tapping. For example, in a case where a gas generating agent having a columnar shape is used, a desired amount of gas generating agent is collectively charged and filled into the space serving as the combustion chamber, without aligning the orientation of the gas generating agent and the like.

An accommodation rate (filling rate) of the gas generating agent is not limited, but for example, an accommodation rate determined from the following formula, i.e., (total volume of gas generating agent)/(volume of combustion chamber)× 100, can be in a range from 40 to 70%. The volume of gas generating agent is a volume obtained when the agent has no recess or through hole.

Next, after the cup-shaped partition wall is inserted, a known enhancing agent (including a gas generating agent serving as an enhancing agent) is accommodated in a space serving as an enhancer chamber.

Then, an igniter is attached to the opening of the first end portion.

To prevent pulverization, the gas generating agent in the combustion chamber is tightly accommodated not to be moved by vibration from the outside, but is randomly accommodated, and thus, a large number of the gas generating agents face in different directions. There is a gap near the central axis of the combustion chamber, in which the gas generating agent is accommodated, and the gap is a gap (for example, a zigzag gap) that varies in a random direction between the first end portion and the second end portion, and thus, combustion gas generated by combustion of the gas generating agent cannot easily move from the first end portion to the second end portion of the housing.

On the other hand, at a position along the inner wall surface of the cylindrical housing, since the gas generating agent contacts the inner wall surface of the cylindrical housing, which is a curved surface, a gap making the first end portion and the second end portion communicate with each other is easily formed, compared with the portion near the central axis of the cylindrical housing. Thus, the combustion gas generated by the combustion of the gas generating agent and the combustion products (high-temperature gas or flames) from the enhancing agent move easily.

In the gas generator of the first aspect, the cylindrical gap is formed between the peripheral wall body of the cup-shaped partition wall and the cylindrical housing, and the nozzles of the cup-shaped partition wall face the cylindrical gap. Thus, combustion products such as a flame generated when the igniter is activated to ignite and burn the enhancing agent are released from the nozzles into the cylindrical gap.

The combustion products released into the cylindrical gap are straightened while moving through the cylindrical gap, and then flow into the combustion chamber. A gap communicating with the second end portion is more easily formed on the inner wall surface of the cylindrical housing, and thus, even after the combustion products flow into the combustion chamber, some of the combustion products still move along the inner wall surface of the cylindrical housing while threading their way through the gap between the inner wall surface and the gas generating agent in the direction toward the second end portion, and is discharged from the diffuser portion, and the rest of the combustion products ignites and burns the gas generating agent in the process.

The combustion of the gas generating agent in the combustion chamber advances on the basis of both a combustion mode in which combustion advances in the axial direction along the inner wall surface of the cylindrical housing and a combustion mode in which combustion advances inwardly in the radial direction from a position along the inner wall surface of the cylindrical housing.

Since the combustion of the gas generating agent more easily advances along the inner wall surface of the cylindrical housing in this manner, the time it takes since activation of the igniter until beginning of discharge of the combustion gas from the gas discharge port of the diffuser portion can be shortened, and moreover combustibility of the gas generating agent located near the central axis of the cylindrical housing is also improved.

The combustion products from the enhancing agent quickly reach the diffuser portion along the inner wall surface of the cylindrical housing, and thus, a protrusion projecting toward the cylindrical gap is not formed in an area, of the inner wall surface of the cylindrical housing, from the position of the nozzles formed on the peripheral wall body to the bottom of the cup-shaped partition wall. This is because if there is a protrusion in this area, the protrusion causes the combustion products to face inwardly in the radial direction, resulting in disturbance of the flow toward the side of the second end portion.

In a preferred aspect of the gas generator of the first aspect, a ratio (d/D) of an outer diameter (d) of the peripheral wall body of the cup-shaped partition wall to an inner diameter (D) of the inner wall surface of the cylindrical housing radially facing the peripheral wall body of the cup-shaped partition wall is in a range from 0.80 to 0.95, and a ratio (L1/L2) of an axial length (L1) of the cylindrical gap to an axial length (L2) of the combustion chamber is in a range from 0.05 to 0.5.

The d/D is a ratio indicating a width of the cylindrical gap. Preferably the d/D is within the aforementioned range, because the combustion products generated in the enhancer chamber more easily flow along the inner wall surface of the cylindrical housing after entering the combustion chamber through the cylindrical gap.

An excessively large width of the cylindrical gap is not preferable, because the combustion products generated in the enhancer chamber cannot be sufficiently directed while passing through the cylindrical gap, and easily diffuse when entering the combustion chamber, as a result of which the amount of combustion products flowing along the inner wall surface of the cylindrical housing decreases. In addition, the gas generating agent more easily enter the cylindrical gap, whereby the flow along the inner wall surface of the cylindrical housing is further disturbed.

The L1/L2 is a ratio indicating a length of the cylindrical gap. Preferably the L1/L2 is within the aforementioned range, because the combustion products generated in the enhancer chamber more easily flow along the inner wall surface of the cylindrical housing after entering the combustion chamber through the cylindrical gap.

An excessively short length of the cylindrical gap is not preferable, because the combustion products generated in the enhancer chamber cannot be sufficiently directed while passing through the cylindrical gap, and easily diffuse when entering the combustion chamber, as a result of which the amount of combustion products flowing along the inner wall surface of the cylindrical housing decreases.

A preferred aspect of the gas generator of the first aspect has a configuration in which the peripheral wall body of the cup-shaped partition wall has a uniform outer diameter, the inner wall surface of the cylindrical housing radially facing the peripheral wall body of the cup-shaped partition wall has a uniform inner diameter, and the cylindrical gap has a uniform width.

Preferably the cylindrical gap has a uniform width, because the combustion products generated in the enhancer chamber enter the combustion chamber after being straightened while passing through the cylindrical gap, and thus, the combustion products more easily flow along the inner wall surface of the cylindrical housing, and the gas generating agent at a position contacting with the inner wall surface of the cylindrical housing is more easily burned.

A preferred aspect of the gas generator of the first aspect has a configuration in which the peripheral wall body of the cup-shaped partition wall has a uniform outer diameter, a part or all of the inner wall surface of the cylindrical housing radially facing the annular portion and peripheral wall body of the cup-shaped partition wall is an inclined surface inclined to increase the inner diameter from the annular portion to the peripheral wall body, the nozzles in the peripheral wall body face the inclined surface, and a part or all of the cylindrical gap has a width that increases from a side of the annular portion to a side of the bottom.

In the present aspect, the inclined surface is formed by partially deforming the cylindrical housing itself, but another member to form the inclined surface can be disposed without deforming the cylindrical housing itself.

Since the nozzles formed on the peripheral wall body of the cup-shaped partition wall face the inclined surface of the cylindrical housing, the combustion products generated in the enhancer chamber impinge against the inclined surface after entering the cylindrical gap from the nozzles. As a result, the combustion products are smoothly directed along the inner wall surface of the cylindrical housing and straightened while passing through the cylindrical gap. This is preferable because the combustion products that entered the combustion chamber from the cylindrical gap more easily flow along the inner wall surface of the cylindrical housing, and the gas generating agent at a position contacting with the inner wall surface of the cylindrical housing is more easily burned.

A preferred aspect of the gas generator of the first aspect has a configuration in which the peripheral wall body of the cup-shaped partition wall includes a plurality of grooves, the plurality of grooves are extended from the annular portion to a boundary contiguous with the bottom and are formed in a circumferential direction, the nozzle of the peripheral wall body is formed in the grooves, the inner wall surface of the cylindrical housing radially facing the peripheral wall body of the cup-shaped partition wall has a uniform inner diameter, and the cylindrical gap has a non-uniform width.

The peripheral wall body of the cup-shaped partition wall includes a plurality of grooves, and thus, a width of the cylindrical gap between the grooves and the inner wall surface of the cylindrical housing is greater than a width of the cylindrical gap between the peripheral wall body devoid of the grooves and the inner wall surface of the cylindrical housing.

This is preferable because the combustion products generated in the enhancer chamber enter the cylindrical gap, then are straightened while flowing along the grooves, and thus, the combustion products more easily flow along the inner wall surface of the cylindrical housing and the gas generating agent at a position contacting with the inner wall surface of the cylindrical housing is more easily burned. In addition, the width of the entire cylindrical gap (average width) is increased due to the presence of the grooves, whereby the combustion products can be moved for a shorter period of time.

A preferred aspect of the gas generator of the first aspect is configured such that the inner wall surface of the cylindrical housing radially facing the peripheral wall body of the cup-shaped partition wall has a uniform inner diameter, the peripheral wall body of the cup-shaped partition wall includes an expanded surface portion expanded at a portion that is positioned further toward the side of the bottom than the plurality of nozzles are, and an outer diameter of the expanded surface portion is greater than the outer diameter of the peripheral wall body and is smaller than the inner diameter of the cylindrical housing, and the cylindrical gap between the peripheral wall body and the inner wall surface of the cylindrical housing radially facing the peripheral wall body has a uniform width, and an outlet port to the combustion chamber from the cylindrical gap is an annular constricted portion formed by the expanded surface portion and the inner wall surface of the cylindrical housing.

The expanded surface portion formed in an area of the peripheral wall body may be formed by expanding the bottom itself or may be formed by fixing another member to the bottom or the peripheral wall body.

The annular constricted portion is formed on the cylindrical housing side between the cup-shaped partition wall and the inner wall surface of the cylindrical housing.

The outlet port to the combustion chamber from the cylindrical gap is the annular constricted portion positioned further toward the inner diameter surface side of the cylindrical housing, and thus, when the combustion products pass through the annular constricted portion from the cylindrical gap and reach the combustion chamber, the combustion products are ejected in a state where a discharging speed is increased, and more easily flow along the inner wall surface of the cylindrical housing. As a result, an ignition speed of the gas generating agent is also increased, whereby the gas generating agent at the position contacting with the inner wall surface of the cylindrical housing is more easily burned and the time it takes for the combustion gas to reach the diffuser portion is further shortened.

A preferred aspect of the gas generator of the first aspect has a configuration in which the peripheral wall body of the cup-shaped partition wall includes a maximum outer diameter portion protruding outwardly from the peripheral wall body, and an inclined surface portion between the maximum outer diameter portion and the peripheral wall body, and the inclined surface portion includes the nozzles, the inner wall surface of the cylindrical housing radially facing the peripheral wall body of the cup-shaped partition wall has a uniform inner diameter, and the cylindrical gap has a non-uniform width, and an outlet port to the combustion chamber from the cylindrical gap is an annular constricted portion formed by the maximum outer diameter portion and the inner wall surface of the housing.

The annular constricted portion is formed on the cylindrical housing side between the cup-shaped partition wall and the inner wall surface of the cylindrical housing. The outlet port to the combustion chamber from the cylindrical gap is the annular constricted portion positioned further toward the inner diameter surface side of the cylindrical housing, and thus, when the combustion products pass through the annular constricted portion from the cylindrical gap and reach the combustion chamber, the combustion products are ejected in a state where a discharging speed is increased, and more easily flow along the inner wall surface of the cylindrical housing. As a result, an ignition speed of the gas generating agent is also increased, whereby the gas generating agent at the position contacting with the inner wall surface of the cylindrical housing is more easily burned and the time it takes for the combustion gas to reach the diffuser portion is further shortened.

A gas generator of a second aspect differs from the gas generator of the first aspect in terms of the external shape of the cup-shaped partition wall, and due to this difference, the form of the gap between the cup-shaped partition wall and the inner wall surface of the cylindrical housing differs therebetween, but other configurations are the same as those of the gas generator of the first aspect.

In the cup-shaped partition wall, the entire surface of the peripheral wall excluding the groove portion of the groove-formed portion abuts against the inner wall surface of the cylindrical housing, and thus, a plurality of groove-shaped gaps that are spaced in the circumferential direction and axially extend are formed between the groove-formed portion of the cup-shaped partition wall and the inner wall surface of the cylindrical housing. The width and depth of the groove of the groove-formed portion may be adjusted to adjust the volume of the gap itself.

Preferably the gas generator of the second aspect includes the groove-shaped gaps, because, after the combustion products generated in the enhancer chamber enter the combustion chamber through the groove-shaped gaps, the combustion products are straightened to more easily flow along the inner wall surface of the cylindrical housing, that is, flow toward the diffuser portion, whereby the gas generating agent at the position contacting with the inner wall surface of the cylindrical housing is more easily burned.

In the gas generator according to an embodiment of the present invention, the combustibility of the gas generating agent and the dischargeability of the combustion gas are improved by utilizing a gap formed by the inner wall surface of the cylindrical housing and the cup-shaped partition wall without disposing, inside the combustion chamber, a member for improving the combustibility of the gas generating agent accommodated in the combustion chamber.

The gas generator according to an embodiment of the present invention can be utilized for a gas generator for an airbag device mounted in an automobile.

DESCRIPTION OF EMBODIMENTS

1. Gas Generator in FIGS. 1A and 1B

Figure 1A:
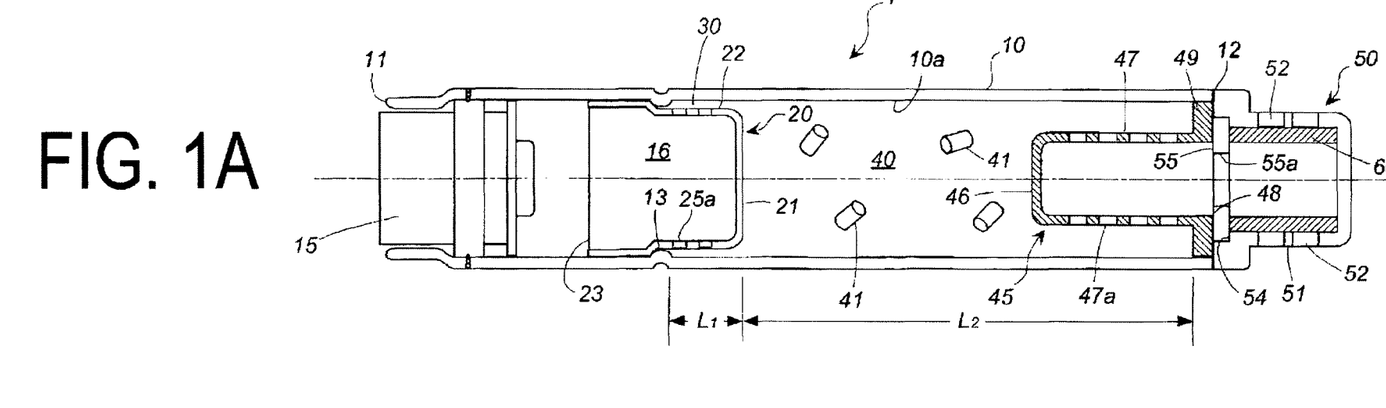
FIG. 1A is an axial cross-sectional view of a gas generator according to an embodiment of the present invention.
Figure 1B:
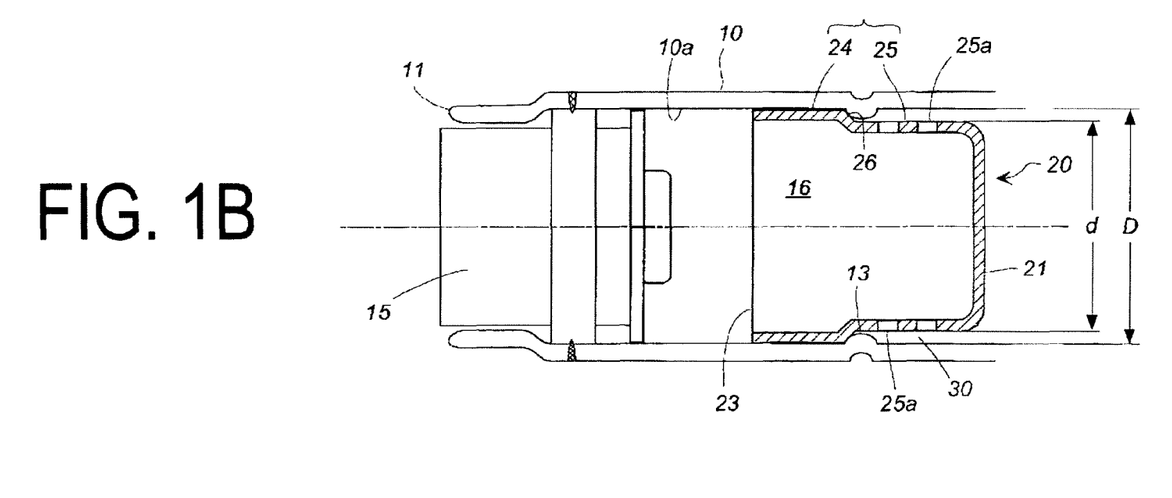
FIG. 1B is a partially enlarged cross-sectional view of FIG. 1A.

A gas generator 1 includes an enhancer chamber 16, a combustion chamber 40, and a diffuser portion 50, in order, in a direction from a first end portion 11 to a second end portion 12 of a cylindrical housing 10. The cylindrical housing 10 has a uniform inner diameter except for a portion having an inner projection part 13 and the first end portion 11 side to which an igniter 15 is fixed.

The igniter 15 that is same as an igniter used in a known gas generator is attached to an opening of the first end portion 11 of the cylindrical housing 10. A cup-shaped partition wall 20 is disposed at an interval in an axial direction from the igniter 15, and an internal space sandwiched, in an axial direction (which is along a dashed line in FIGS. 1A and 1B), between the igniter 15 and the cup-shaped partition wall 20 is the enhancer chamber 16.

The enhancer chamber 16 of the embodiment illustrated in FIGS. 1A and 1B is a space surrounded by the igniter 15, an inner wall surface 10a of the cylindrical housing, and the cup-shaped partition wall 20, but may be a space surrounded by the igniter 15 and the cup-shaped partition wall 20 when an opening 23 of the cup-shaped partition wall 20 abuts against the igniter 15. The enhancer chamber 16 accommodates a known enhancing agent or a gas generating agent serving as an enhancing agent (not illustrated).

The cup-shaped partition wall 20 includes a bottom 21, a peripheral wall 22, and the opening 23, and the bottom 21 faces the combustion chamber 40 and the opening 23 faces the igniter 15. The bottom 21 is a surface that contacts with a gas generating agent 41 in the combustion chamber 40, and thus can be covered with a cushioning material as necessary.

The peripheral wall 22 includes a large-diameter peripheral wall 24 on the opening 23 side, a small-diameter peripheral wall 25 having an outer diameter smaller than an outer diameter of the large-diameter peripheral wall 24 on the bottom 21 side, and an annular stepped portion 26 between the large-diameter peripheral wall 24 and the small-diameter peripheral wall 25. The outer diameter of the large-diameter peripheral wall 24 is uniform, and the outer diameter of the small-diameter peripheral wall 25 is uniform.

The small-diameter peripheral wall 25 includes a plurality of nozzles 25a formed at equal intervals in the circumferential direction. The nozzles 25a penetrate the small-diameter peripheral wall 25 in a thickness direction thereof.

An outer surface of the large-diameter peripheral wall 24 of the cup-shaped partition wall 20 abuts against the inner wall surface 10a of the cylindrical housing. The annular stepped portion 26 of the cup-shaped partition wall 20 is prevented from moving toward the second end portion 12 side, by being made to abut against the inner projection part 13 formed on the inner wall surface 10a of the cylindrical housing. The inner projection part 13 may formed in plurality at intervals in the circumferential direction, for example.

A cylindrical gap 30 having a uniform width is formed between the small-diameter peripheral wall 25 of the cup-shaped partition wall 20 and the inner wall surface 10a of the cylindrical housing radially facing the small-diameter peripheral wall 25. The width of the cylindrical gap 30 has a size that does not allow the gas generating agent 41 in the combustion chamber 40 to enter the gap. The nozzles 25a formed in the small-diameter peripheral wall 25 face the cylindrical gap 30.

The gas generating agent 41 that is same as a gas generating agent used in a known gas generator is accommodated in the combustion chamber 40.

In the embodiment illustrated in FIGS. 1A and 1B, a cup member 45 is disposed on the diffuser portion 50 side, but an embodiment may not include the cup-member 45.

The cup member 45 includes a cup member bottom surface 46, a cup member peripheral wall 47, a cup member opening 48, and a cup member flange part 49, and the cup member peripheral wall 47 includes a plurality of first gas passage holes 47a. The first gas passage holes 47a have a size that does not allow the gas generating agent 41 to enter these holes.

The flange part 49 of the cup member 45 is pressed into the cylindrical housing 10, and the flange part 49 abuts against the diffuser portion 50.

A ratio (d/D) of the outer diameter (d) of the small-diameter peripheral wall 25 of the cup-shaped partition wall 20 to the inner diameter (D) of the inner wall surface 10a of the cylindrical housing radially facing the small-diameter peripheral wall 25 of the cup-shaped partition wall 20 is about 0.9.

A ratio (L1/L2) of the axial length (L1) of the cylindrical gap 30 to the axial length (L2) of the combustion chamber 40 is about 0.15.

The diffuser portion 50 is attached to the cylindrical housing 10 to occlude an opening on the second end portion 12 side of the cylindrical housing 10. The diffuser portion 50 is cup-shaped, and a plurality of gas discharge ports 52 are formed on a peripheral wall 51 of the diffuser portion 50.

In the embodiment illustrated in FIGS. 1A and 1B, an annular plate 55 is disposed at a stepped portion 54 on the side of the opening of the diffuser portion 50, and is welded and fixed to the stepped portion 54. The annular plate 55 includes in the center thereof a single second gas passage hole 55a. A sealing tape is stuck to the second gas passage hole 55a from the diffuser portion 50 side for the purpose of moisture prevention.

A cylindrical filter 60 is disposed on the diffuser portion 50 to cover the gas discharge port 52 from the inside.

Next, operation in a case, where the gas generator 1 illustrated in FIGS. 1A and 1B is used as a gas generator for an airbag device, will be described.

The igniter 15 is activated to ignite and burn the enhancing agent in the enhancer chamber 16, whereby combustion products such as flame or high-temperature gas are generated. The combustion products in the enhancer chamber 16 flow out from the nozzles 25a into the cylindrical gap 30.

The combustion products that entered the cylindrical gap 30 are straightened while moving within the cylindrical gap 30 and enter the combustion chamber 40, then further move along the inner wall surface 10a while threading their way through the gap between the inner wall surface 10a of the cylindrical housing and a plurality of the gas generating agents 41, and some of the combustion products move to the second end portion 12, flow into the diffuser portion 50 from the first gas passage holes 47a of the cup member peripheral wall 47, and are discharged from the gas discharge port 52. Furthermore, the rest of the combustion products passes through the gap between the inner wall surface 10a and the gas generating agents 41, and ignites and burns the gas generating agents 41 in the vicinity of the rest thereby generating combustion gas.

Thereafter, the combustion of the gas generating agents 41 first advances along the inner wall surface 10a of the cylindrical housing, then also advances inwardly in the radial direction of the cylindrical housing 10, whereby the entire gas generating agents 41 in the combustion chamber 40 is ignited and burned. Thus, the combustion gas generated by the combustion along the inner wall surface 10a of the cylindrical housing passes through the first gas passage holes 47a of the cup member 45, passes through the second gas passage hole 55a of the annular plate 55 to enter the diffuser portion 50, and then passes through the cylindrical filter 60 and is discharged from the gas discharge port 52, whereby an airbag is inflated. Thereafter, the combustion gas generated by igniting and burning the remaining gas generating agent 41 in the combustion chamber 40 is discharged through the same discharge path, whereby an airbag is inflated.

In this way, some of the combustion products from the enhancer chamber and the combustion gas previously generated by the gas generating agent are discharged along the inner wall surface 10a of the cylindrical housing, and thus, the time required from activation of the igniter 15 until beginning of discharging the combustion gas from the gas discharge port 52 is shortened. In addition, the combustibility of the entire gas generating agent 41 in the combustion chamber 40 is also improved, and thus, excellent inflation performance of the airbag is obtained. In particular, the cylindrical gap 30 does not include a portion protruding inwardly from the inner wall surface 10a of the cylindrical housing 10 from the nozzles 25a throughout to the bottom 21 of the cup-shaped partition wall 20, and thus, the flow of the combustion products from the cylindrical gap 30 to the combustion chamber 40 is not disturbed, and the combustion products can reach the side of the second end portion 12 of the combustion chamber 40 more easily.

2. Gas Generator in FIG. 2

Figure 2:
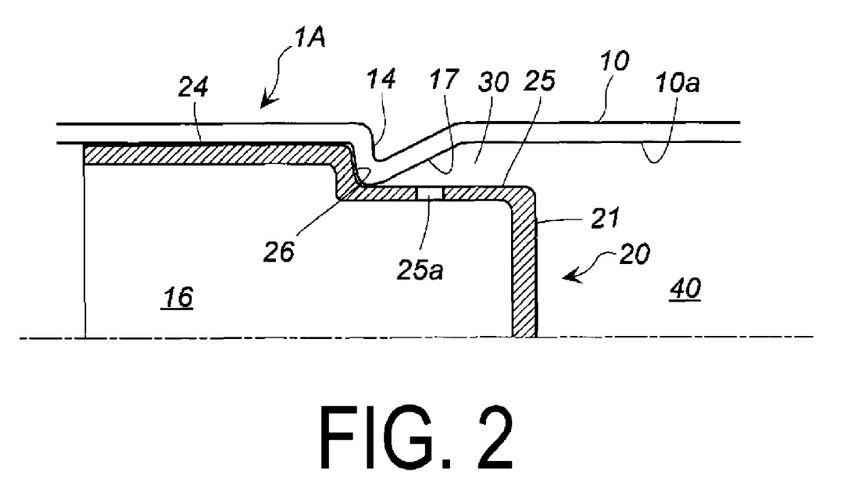
FIG. 2 is a partial cross-sectional view of a gas generator according to another embodiment different from the embodiment illustrated in FIGS. 1A and 1B.

A gas generator 1A in FIG. 2 is the same as the gas generator 1 in FIGS. 1A and 1B, except that the shape of the cylindrical housing 10 is partially different therebetween.

An annular recess 14 and an inclined surface portion 17 are formed to the inner wall surface 10a of the cylindrical housing that radially faces the annular stepped portion 26 and the small-diameter peripheral wall 25 of the cup-shaped partition wall 20.

The annular recess 14 is a portion where a part of the cylindrical housing 10 is continuously recessed in the circumferential direction, and the annular recess 14 abuts against the annular stepped portion 26 and the small-diameter peripheral wall 25 of the cup-shaped partition wall 20.

The inclined surface portion 17 is inclined such that the inner diameter of the cylindrical housing 10 increases from the annular stepped portion 26 toward the side of the small-diameter peripheral wall 25.

The cylindrical gap 30 between the cup-shaped partition wall 20 and the inner wall surface 10a of the cylindrical housing includes a portion having a width that increases from the annular stepped portion 26 side toward the bottom 21 side.

The nozzles 25a formed in the small-diameter peripheral wall 25 of the cup-shaped partition wall 20 are positioned to radially face the inclined surface portion 17.

Operation of the gas generator 1A in FIG. 2 will be described. Note that parts that are not illustrated in FIG. 2 but are the same as those in FIGS. 1A and 1B will be described according to FIGS. 1A and 1B.

The igniter 15 is activated to ignite and burn the enhancing agent in the enhancer chamber 16, whereby combustion products such as flame or high-temperature gas are generated. The combustion products in the enhancer chamber 16 flow out from the nozzles 25a into the cylindrical gap 30.

The combustion products that entered the cylindrical gap 30 impinge against the inclined surface portion 17 to change the orientation toward the axial direction, flow along the inner wall surface 10a of the cylindrical housing and enter the combustion chamber 40, then some of the combustion products further move along the inner wall surface 10a while threading their way through the gap between the inner wall surface 10a of the cylindrical housing and the gas generating agent 41 as well as the gap between the gas generating agents 41 until reaching the second end portion 12 side of the combustion chamber 40, and then flow to the diffuser portion 50 from the first gas passage holes 47a of the cup member peripheral wall 47 and are discharged from the gas discharge port 52. Furthermore, the rest of the combustion products passes through the gap between the inner wall surface 10a and the gas generating agents 41, and ignites and burns the gas generating agents 41 in the vicinity of the rest thereby generating combustion gas.

As described above, in the gas generator 1A illustrated in FIG. 2, the combustion products flowing out from the nozzles 25a first impinge against the inclined surface portion 17, and thus, in comparison with the embodiment of FIGS. 1A and 1B in which a portion corresponding to the inclined surface portion 17 is a flat surface, the combustion products more easily flow along the inner wall surface 10a of the housing. As a result, the gas generator 1A more likely exhibits the effect of the present invention.

3. Gas Generator including Cup-Shaped Partition Wall in FIG. 3

Figure 3:
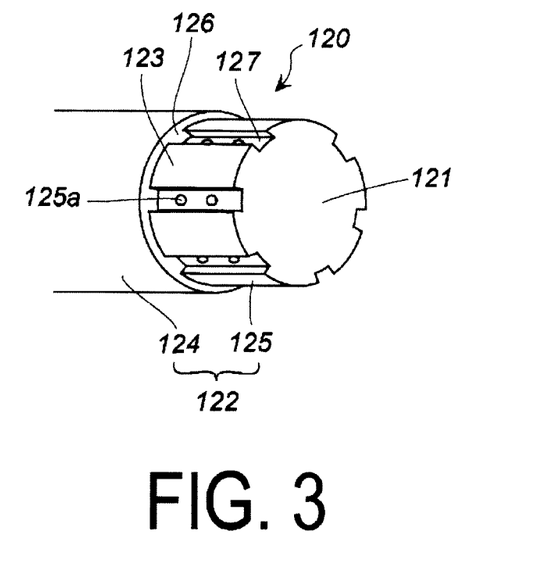
FIG. 3 is a partial perspective view of a cup-shaped partition wall of a gas generator according to still another embodiment.

A cup-shaped partition wall 120 in FIG. 3 differs from the cup-shaped partition wall 20 of the gas generator 1 illustrated in FIGS. 1A and 1B, but the cup-shaped partition wall 120 in FIG. 3 is replaceable, without any modification, with the cup-shaped partition wall 20 of the gas generator 1 illustrated in FIGS. 1A and 1B.

The cup-shaped partition wall 120 includes a bottom 121, a peripheral wall 122 formed of a large-diameter peripheral wall 124 and a small-diameter peripheral wall 125, an annular stepped portion 126, and an opening that is not illustrated.

The small-diameter peripheral wall 125 includes a plurality of grooves 127 that are extended from the annular stepped portion 126 to a boundary contiguous with the bottom 121 and that are formed at equal intervals in the circumferential direction, and a surface 123 in which the grooves 127 are not formed. Nozzles 125a are formed in each of the grooves 127.

When the cup-shaped partition wall 120 illustrated in FIG. 3 is disposed in place of the cup-shaped partition wall 20 of the gas generator 1 illustrated in FIGS. 1A and 1B, a cylindrical gap formed between the small-diameter peripheral wall 125 and the inner wall surface 10a of the cylindrical housing has a non-uniform width due to the presence of the plurality of grooves 127.

Therefore, in a case where the outer diameter of the surface 123 having no grooves 127 of the small-diameter peripheral wall 125 and the outer diameter of the small-diameter peripheral wall 20 of the cup-shaped partition wall 20 are the same, a wider cylindrical gap is obtained partially when the cup-shaped partition wall 120 in FIG. 3 is used.

Operation in a case where the cup-shaped partition wall 120 illustrated in FIG. 3 is disposed in place of the cup-shaped partition wall 20 of the gas generator 1 illustrated in FIGS. 1A and 1B will be described.

The igniter 15 is activated to ignite and burn the enhancing agent in the enhancer chamber 16, whereby combustion products such as flame or high-temperature gas are generated. The combustion products in the enhancer chamber 16 flow out from the nozzles 125a into the cylindrical gap 30.

The combustion products that entered the cylindrical gap 30 impinge against the inner wall surface 10a of the cylindrical housing to change the orientation toward the axial direction, then flow along the inner wall surface 10a of the cylindrical housing and enter the combustion chamber 40.

Thereafter, some of the combustion products further move along the inner wall surface 10a while threading their way through the gap between the inner wall surface 10a of the cylindrical housing and the gas generating agent 41 as well as the gap between the gas generating agents 41 until reaching the second end portion 12 side of the combustion chamber 40, then flow to the diffuser portion 50 from the first gas passage holes 47a of the cup member peripheral wall 47 and are discharged from the gas discharge port 52. Furthermore, the rest of the combustion products passes through the gap between the inner wall surface 10a and the gas generating agents 41, and ignites and burns the gas generating agents 41 in the vicinity of the rest thereby generating combustion gas.

As described above, in the gas generator using the cup-shaped partition wall 120 illustrated in FIG. 3, since the cylindrical gap 30 is wider due to the grooves 127 and since the combustion products flow along the grooves 127, the combustion products more easily flow out from the nozzles 125a along the inner wall surface 10a of the housing. As a result, the gas generator using the cup-shaped partition wall 120 illustrated in FIG. 3 more likely exhibits the effect of the present invention.

4. Gas Generator in FIG. 4

Figure 4:
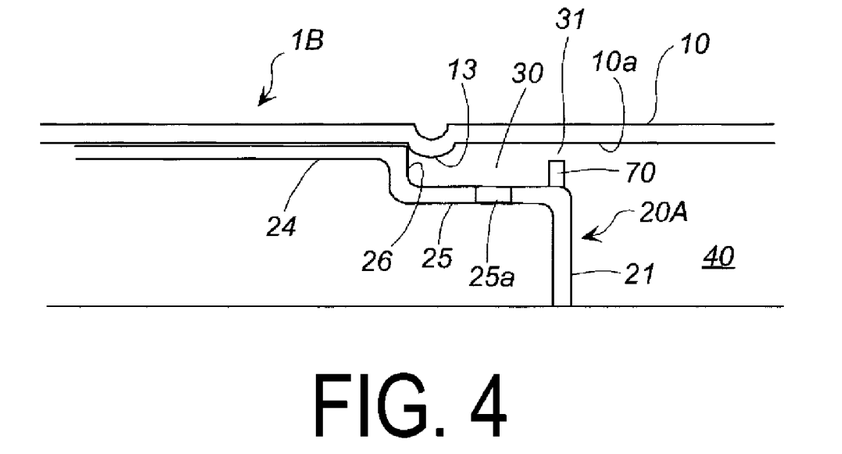
FIG. 4 is a partial cross-sectional view of a gas generator according to yet another embodiment.

A gas generator 1B in FIG. 4 is the same as the gas generator 1 in FIGS. 1A and 1B, except that the shape of a cup-shaped partition wall 20A is partially different from that in FIGS. 1A and 1B. A body portion (portion excluding an expanded flat portion 70) of the cup-shaped partition wall 20A is the same as that of the cup-shaped partition wall 20 used in the gas generator 1 illustrated in FIGS. 1A and 1B, but the cup-shaped partition wall 20A differs from the cup-shaped partition wall 20 in that the bottom 21 of the cup-shaped partition wall 20A includes the expanded flat portion 70 that is expanded outwardly in the radial direction.

The outer diameter of the expanded flat portion 70 is greater than the outer diameter of the small-diameter peripheral wall 25 and is smaller than the inner diameter of the cylindrical housing 10. The expanded flat portion 70 may be provided by using an annular member that is fixed to the bottom 21 of the body portion of the cup-shaped partition wall 20A as illustrated in FIG. 4, or by using a disk member that is fixed to the bottom 21 of the body portion of the cup-shaped partition wall 20A.

The cylindrical gap 30 between the small-diameter peripheral wall 25 and the inner wall surface 10a of the cylindrical housing radially facing the small-diameter peripheral wall 25 has a uniform width except a portion where the inner projection part 13 is located.

The outlet port to the combustion chamber 40 from the cylindrical gap 30 is an annular constricted portion 31 formed by the expanded flat portion 70 and the inner wall surface 10a of the cylindrical housing. The width of the annular constricted portion 31 is smaller than the width of the cylindrical gap 30, and can be sized to approximately ½ to ⅕ of the width of the cylindrical gap 30, for example.

Operation of the gas generator 1B in FIG. 4 will be described. Note that parts that are not illustrated in FIG. 4 but are the same as those in FIGS. 1A and 1B will be described according to FIGS. 1A and 1B.

The igniter 15 is activated to ignite and burn the enhancing agent in the enhancer chamber 16, whereby combustion products such as flame or high-temperature gas are generated. The combustion products in the enhancer chamber 16 flow out from the nozzles 25a into the cylindrical gap 30.

The combustion products that entered the cylindrical gap 30 are straightened while flowing through the cylindrical gap 30, and are then ejected from the annular constricted portion 31 to flow along the inner wall surface 10a of the cylindrical housing within the combustion chamber 40. Some of the combustion products move along the inner wall surface 10a while threading their way through the gap between the inner wall surface 10a of the cylindrical housing and the gas generating agent 41 through the annular constricted portion 31 until reaching the second end portion 12 side of the combustion chamber 40, then flow to the diffuser portion 50 from the first gas passage holes 47a of the cup member peripheral wall 47 and are discharged from the gas discharge port 52. Furthermore, the rest of the combustion products passes through the gap between the inner wall surface 10a and the gas generating agents 41, and ignites and burns the gas generating agents 41 in the vicinity of the rest thereby generating combustion gas.

As described above, in the gas generator 1B illustrated in FIG. 4, the combustion products flowing out from the nozzles 25a are ejected from the annular constricted portion 31 of the cylindrical gap 30 into the combustion chamber 40, and thus, the combustion products more easily flow along the inner wall surface 10a of the housing. As a result, the gas generator 1B more likely exhibits the effect of the present invention.

5. Gas Generator in FIG. 5

Figure 5:
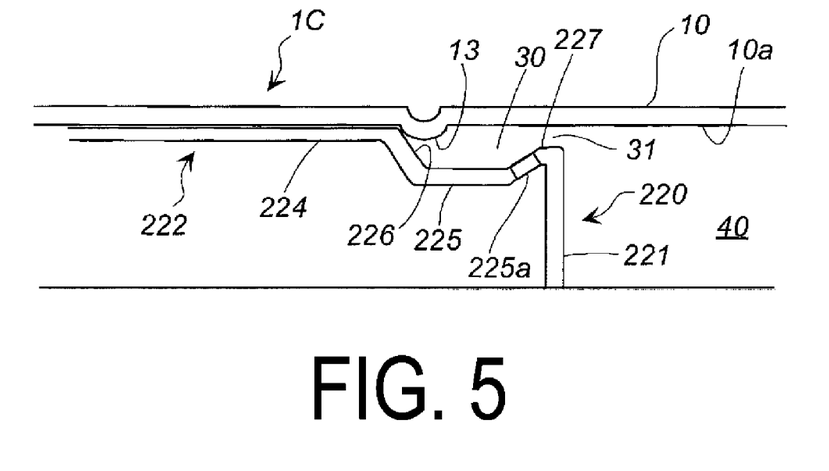
FIG. 5 is a partial cross-sectional view of a gas generator according to a further embodiment.

A gas generator 1C in FIG. 5 is the same as the gas generator 1 in FIGS. 1A and 1B, except that the shape of a cup-shaped partition wall 220 is partially different that of the cup-shaped partition wall 20 in FIGS. 1A and 1B.

The cup-shaped partition wall 220 includes a peripheral wall 222 formed of a large-diameter peripheral wall 224 and a small-diameter peripheral wall 225, an annular stepped portion 226, a bottom 221, and an opening that is not illustrated.

The small-diameter peripheral wall 225 includes an inclined surface portion 227 between a maximum outer diameter portion on the bottom 221 side and a uniform outer diameter portion on the annular stepped portion 226 side, and the inclined surface portion 227 includes nozzles 225a.

The cylindrical gap 30 between the small-diameter peripheral wall 225 and the inner wall surface 10a of the cylindrical housing radially facing the small-diameter peripheral wall 225 has a uniform width except a portion where the inner projection part 13 is located, and the outlet port to the combustion chamber 40 from the cylindrical gap 30 is the annular constricted portion 31 formed by the inclined surface portion 227 and the inner wall surface 10a of the cylindrical housing.

The width of the annular constricted portion 31 is smaller than the width of the cylindrical gap 30 between the inner wall surface 10a of the cylindrical housing 10 and the small-diameter peripheral wall 225, and can be sized to approximately ½ to ⅕ of the width of the cylindrical gap 30, for example.

Operation of the gas generator 1C in FIG. 5 will be described. Note that parts that are not illustrated in FIG. 5 but are the same as those in FIGS. 1A and 1B will be described according to FIGS. 1A and 1B.

The igniter 15 is activated to ignite and burn the enhancing agent in the enhancer chamber 16, whereby combustion products such as flame or high-temperature gas are generated. The combustion products in the enhancer chamber 16 flow out from the nozzles 225a into the cylindrical gap 30.

The combustion products that entered the cylindrical gap 30 are straightened while flowing through the cylindrical gap 30, and are then ejected from the annular constricted portion 31 to flow along the inner wall surface 10a of the cylindrical housing within the combustion chamber 40. Some of the combustion products move along the inner wall surface 10a while threading their way through the gap between the inner wall surface 10a of the cylindrical housing and the gas generating agent 41 through the annular constricted portion 31 until reaching the second end portion 12 side of the combustion chamber 40, then flow to the diffuser portion 50 from the first gas passage holes 47a of the cup member peripheral wall 47 and are discharged from the gas discharge port 52. Furthermore, the rest of the combustion products passes through the gap between the inner wall surface 10a and the gas generating agents 41, and ignites and burns the gas generating agents 41 in the vicinity of the rest thereby generating combustion gas.

As described above, in the gas generator 1C illustrated in FIG. 5, the combustion products flowing out from the nozzles 225a are ejected from the annular constricted portion 31 of the cylindrical gap 30 into the combustion chamber 40, and thus, the combustion products more easily flow along the inner wall surface 10a of the housing. As a result, the gas generator 1C more likely exhibits the effect of the present invention.

6. Gas Generator including Cup-Shaped Partition Wall in FIG. 6

Figure 6:
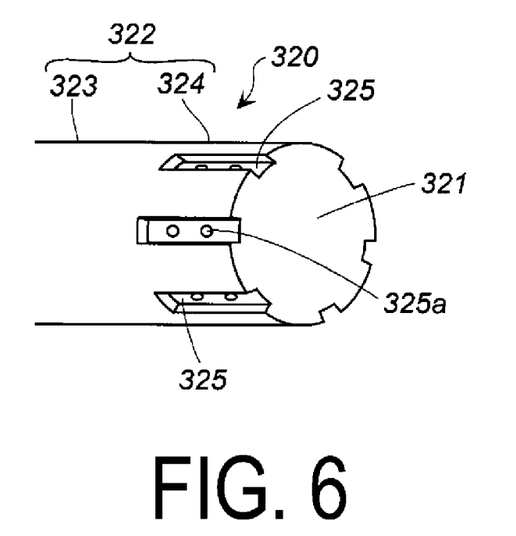
FIG. 6 is a partial perspective view of a cup-shaped partition wall of a gas generator according to still further embodiment.

A cup-shaped partition wall 320 in FIG. 6 differs from the cup-shaped partition wall 20 of the gas generator 1 illustrated in FIGS. 1A and 1B, but the cup-shaped partition wall 320 in FIG. 6 is replaceable, without any modification, with the cup-shaped partition wall 20 of the gas generator 1 illustrated in FIGS. 1A and 1B.

The cup-shaped partition wall 320 includes a bottom 321, a peripheral wall 322, and an opening that is not illustrated.

A portion of the peripheral wall 322 on the bottom 321 side is a groove-formed portion 324 including a plurality of grooves 325, and a remaining portion of the peripheral wall 322 on the side of the opening is a non groove-formed portion 323 devoid of the grooves.

The plurality of grooves 325 in the groove-formed portion 324 are extended from a boundary contiguous with the bottom 321 to the non groove-formed portion 323 and are formed at equal intervals in the circumferential direction, and nozzles 325a are formed in the grooves 325.

In the cup-shaped partition wall 320, an outer surface of the peripheral wall 322 (the non groove-formed portion 323 and a portion of the groove-formed portion 324 where there is no grooves 325) abuts against the inner wall surface 10a of the cylindrical housing, and a plurality of axially extending gaps (gaps surrounded by the grooves 325 and the inner wall surface 10a of the cylindrical housing) are formed between the groove-formed portion 324 and the inner wall surface 10a of the cylindrical housing radially facing the groove-formed portion 324. The gaps are devoid of gas generating agents 41.

When the cup-shaped partition wall 320 illustrated in FIG. 6 is disposed in place of the cup-shaped partition wall 20 of the gas generator 1 illustrated in FIGS. 1A and 1B, a gap formed between the peripheral wall 322 and the inner wall surface 10a of the cylindrical housing is formed by a plurality of gaps that originate from the plurality of grooves 325 and are separated at intervals in the circumferential direction.

Operation in a case, where the cup-shaped partition wall 320 illustrated in FIG. 6 is disposed in place of the cup-shaped partition wall 20 of the gas generator 1 illustrated in FIGS. 1A and 1B, will be described.

The igniter 15 is activated to ignite and burn the enhancing agent in the enhancer chamber 16, whereby combustion products such as flame or high-temperature gas are generated. The combustion products in the enhancer chamber 16 flow out from the nozzles 325a into the plurality of gaps between the grooves 325 and the inner wall surface 10a of the cylindrical housing.

The combustion products that entered the plurality of gaps flow from the gaps along the inner wall surface 10a of the cylindrical housing, and enter the combustion chamber 40. Thereafter, some of the combustion products further move along the inner wall surface 10a while threading their way through the gap between the inner wall surface 10a of the cylindrical housing and the gas generating agent 41 until reaching the second end portion 12 side of the combustion chamber 40, then flow to the diffuser portion 50 from the first gas passage holes 47a of the cup member peripheral wall 47 and are discharged from the gas discharge port 52. Furthermore, the rest of the combustion products passes through the gap between the inner wall surface 10a and the gas generating agents 41, and ignites and burns the gas generating agents 41 in the vicinity of the rest thereby generating combustion gas.

As described above, in the gas generator using the cup-shaped partition wall 320 illustrated in FIG. 6, the combustion products flowing out from the nozzles 325a flow out into the plurality of gaps between the grooves 325 and the inner wall surface 10a of the cylindrical housing and flow along the plurality of gaps (substantially the grooves 325), and thus, the combustion products more easily flow along the inner wall surface 10a of the housing. As a result, the gas generator using the cup-shaped partition wall 320 illustrated in FIG. 6 more likely exhibits the effect of the present invention.

7. Gas Generator in FIG. 7

Figure 7:
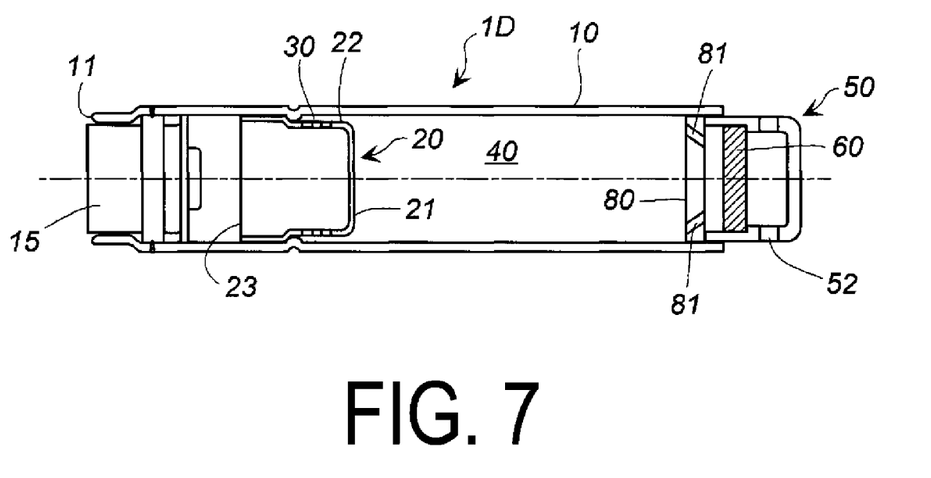
FIG. 7 is an axial cross-sectional view of a gas generator according to a still further embodiment.

A gas generator 1D in FIG. 7 is the same as the gas generator 1 in FIGS. 1A and 1B except that the gas generator 1D includes an orifice plate 80 in place of the cup member 45 of the gas generator 1 in FIGS. 1A and 1B, and with the orifice plate 80 being disposed, the cylindrical filter 60 is disposed differently from the gas generator 1. The orifice plate 80 includes a plurality of orifices 81 penetrating therethrough in the thickness direction.

The cup member 45 of the gas generator 1 in FIGS. 1A and 1B in itself is not essentially required for the effect of the invention of the present application, and the gas generator 1D of the embodiment illustrated in FIG. 7 operates in the same way as the gas generator 1 in FIGS. 1A and 1B, and the same effect can be achieved.

The present invention has been described as above. Of course, the present invention includes various forms of modifications within the scope thereof, and these modifications do not depart from the scope of the invention. All of what a person with ordinary skill in the art will clearly consider as a variation of the present invention is within the scope of the claims set forth below.

The invention claimed is:

1. A gas generator comprising:
   an enhancer chamber provided on a side of a first end portion of a cylindrical housing including an igniter therein;
   a diffuser portion formed with a gas discharge port on a side of a second end portion, which is an axially opposite side to the first end portion; and
   a combustion chamber provided between the diffuser portion and the enhancer chamber, the combustion chamber accommodating a gas generating agent therein, the enhancer chamber including the igniter being an internal space which is axially sandwiched between the igniter fixed on the side of the first end portion of the cylindrical housing and a cup-shaped partition wall disposed within the cylindrical housing, the internal space accommodating an enhancing agent therein, the cup-shaped partition wall including a bottom, a peripheral wall, and an opening, the peripheral wall including a peripheral wall body and an annular portion expanding outwardly from the peripheral wall body, and the peripheral wall body including, in a thickness direction thereof, a plurality of nozzles penetrating the peripheral wall body, and an outer surface of the annular portion of the cup-shaped partition wall abutting against an inner wall surface of the cylindrical housing, a cylindrical gap being formed between the peripheral wall body and the inner wall surface of the cylindrical housing radially facing the peripheral wall body, the nozzles formed in the peripheral wall body being disposed to face the cylindrical gap, and the cylindrical gap being devoid of the gas generating agent therein, wherein a ratio (L1/L2) of an axial length (L1) of the cylindrical gap to an axial length (L2) of the combustion chamber is in a range from 0.05 to 0.5.

2. The gas generator according to claim 1, wherein a ratio (d/D) of an outer diameter (d) of the peripheral wall body of the cup-shaped partition wall to an inner diameter (D) of the inner wall surface of the cylindrical housing radially facing the peripheral wall body of the cup-shaped partition wall is in a range from 0.80 to 0.95.

3. The gas generator according to claim 1, wherein
the peripheral wall body of the cup-shaped partition wall has a uniform outer diameter,
the inner wall surface of the cylindrical housing radially facing the peripheral wall body of the cup-shaped partition wall has a uniform inner diameter, and
the cylindrical gap has a uniform width.

4. The gas generator according to claim 1, wherein
the peripheral wall body of the cup-shaped partition wall has a uniform outer diameter,
a part or all of the inner wall surface of the cylindrical housing radially facing the annular portion and the peripheral wall body of the cup-shaped partition wall is an inclined surface inclined to increase the inner diameter from the annular portion to the peripheral wall body,
the nozzles in the peripheral wall body face the inclined surface, and
a part or all of the cylindrical gap has a width that increases from a side of the annular portion to a side of the bottom.

5. The gas generator according to claim 1, wherein
the peripheral wall body of the cup-shaped partition wall includes a plurality of grooves,
the plurality of grooves is extended from the annular portion to a boundary contiguous with the bottom and are formed in a circumferential direction,
the nozzles in the peripheral wall body are formed in the grooves, the inner wall surface of the cylindrical housing radially facing the peripheral wall body of the cup-shaped partition wall has a uniform inner diameter, and
the cylindrical gap has a non-uniform width.

6. The gas generator according to claim 1, wherein
the inner wall surface of the cylindrical housing radially facing the peripheral wall body of the cup-shaped partition wall has a uniform inner diameter,
the peripheral wall body of the cup-shaped partition wall includes an expanded surface portion expanded at a portion that is positioned further toward the side of the bottom than the plurality of nozzles are, and an outer diameter of the expanded surface portion is greater than the outer diameter of the peripheral wall body and is smaller than an inner diameter of the cylindrical housing, and
the cylindrical gap between the peripheral wall body and the inner wall surface of the cylindrical housing radially facing the peripheral wall body has a uniform width, and an outlet port to the combustion chamber from the cylindrical gap is an annular constricted portion formed by the expanded surface portion and the inner wall surface of the cylindrical housing.

7. The gas generator according to claim 1, wherein
the peripheral wall body of the cup-shaped partition wall includes a maximum outer diameter portion protruding outwardly in a radial direction from the peripheral wall body, and an inclined surface portion between the maximum outer diameter portion and the peripheral wall body, and the inclined surface portion includes the nozzles,
the inner wall surface of the cylindrical housing radially facing the peripheral wall body of the cup-shaped partition wall has a uniform inner diameter, and
the cylindrical gap has a non-uniform width, and an outlet port to the combustion chamber from the cylindrical gap is an annular constricted portion formed by the maximum outer diameter portion and the inner wall surface of the housing.

8. The gas generator according to claim 1, wherein the cup-shaped partition wall includes a large-diameter peripheral wall having an outer diameter larger than an outer diameter of the peripheral wall body, and an annular stepped portion created by a difference between the outer diameter of the peripheral wall body and the outer diameter of the large-diameter peripheral wall.

9. The gas generator according to claim 8, wherein the cup-shaped partition wall is inserted into the cylindrical housing such that, the large-diameter peripheral wall is pressed by the cylindrical housing, or a plurality of inner projections is formed on the inner wall surface of the cylindrical housing to abut against the annular stepped portion.

10. The gas generator according to claim 1, wherein the inner wall of the cylindrical housing from a position of the plurality of nozzles to the bottom of the cup-shaped partition wall is flat.

11. The gas generator according to claim 1, wherein a second nozzle is formed in the bottom of the cup-shaped partition wall.

* * * * *